(12) United States Patent
Deforest

(10) Patent No.: US 8,280,104 B2
(45) Date of Patent: Oct. 2, 2012

(54) DUAL ACQUISITION MINIATURE ALL-SKY CORONAGRAPH

(75) Inventor: Craig Edward Deforest, Boulder, CO (US)

(73) Assignee: Southwest Research Institute, San Antonio, TX (US)

( * ) Notice: Subject to any disclaimer, the term of this patent is extended or adjusted under 35 U.S.C. 154(b) by 1562 days.

(21) Appl. No.: 11/789,111

(22) Filed: Apr. 23, 2007

(65) Prior Publication Data

US 2007/0286461 A1 Dec. 13, 2007

Related U.S. Application Data

(60) Provisional application No. 60/799,286, filed on May 10, 2006.

(51) Int. Cl.
*G06K 9/00* (2006.01)
(52) U.S. Cl. .................. 382/103; 376/194; 385/900
(58) Field of Classification Search .............. 382/100, 382/103, 181, 190, 191; 376/156, 190, 194; 385/900
See application file for complete search history.

(56) References Cited

U.S. PATENT DOCUMENTS

| | | | |
|---|---|---|---|
| 3,979,596 A | 9/1976 | Shaw et al. | |
| 4,027,943 A | 6/1977 | Everett | |
| 4,923,293 A | 5/1990 | Nelles et al. | |
| 4,972,085 A | 11/1990 | Weber et al. | |
| 5,189,295 A | 2/1993 | Falbel | |
| 5,249,080 A | 9/1993 | Watson et al. | |
| 5,450,352 A * | 9/1995 | Ftaclas et al. | 356/124.5 |
| 6,596,997 B2 | 7/2003 | Kaufman | |
| 6,603,069 B1 * | 8/2003 | Muhs et al. | 136/246 |
| 6,622,970 B2 * | 9/2003 | Guo | 244/168 |
| 7,693,412 B2 * | 4/2010 | Atkinson | 396/150 |
| 7,715,099 B2 * | 5/2010 | Shih | 359/486.01 |
| 7,773,307 B2 * | 8/2010 | Shih | 359/668 |
| 2003/0006345 A1 * | 1/2003 | Guo | 244/168 |
| 2010/0263709 A1 * | 10/2010 | Norman et al. | 136/246 |

* cited by examiner

*Primary Examiner* — Anand Bhatnagar
(74) *Attorney, Agent, or Firm* — Kammer Browning PLLC

(57) ABSTRACT

A system for simultaneously imaging the corona and inner heliosphere of the Sun from a space borne platform. The system includes, a wide-field annular coronagraph (WAC) having annular, aspheric reflecting optics centered on an axis coinciding with the azimuthal orientation of the imaging system towards the Sun. The WAC incorporates an occulting cone having an axis of symmetry coinciding with that of the reflecting optic system and a baffle system for reducing stray light at angles far from the Sun. The system includes a solar coronal imager (SCI) positioned within the occulting cone of the WAC. The SCI includes axially aligned refracting optics centered on an axis coinciding with the azimuthal orientation of the imaging system and includes at least one occulting disk. The WAC and SCI each utilize digital electronic imaging and associated image processing instrumentation. The occulting cone of the WAC also functions as a radiative cooler.

6 Claims, 1 Drawing Sheet

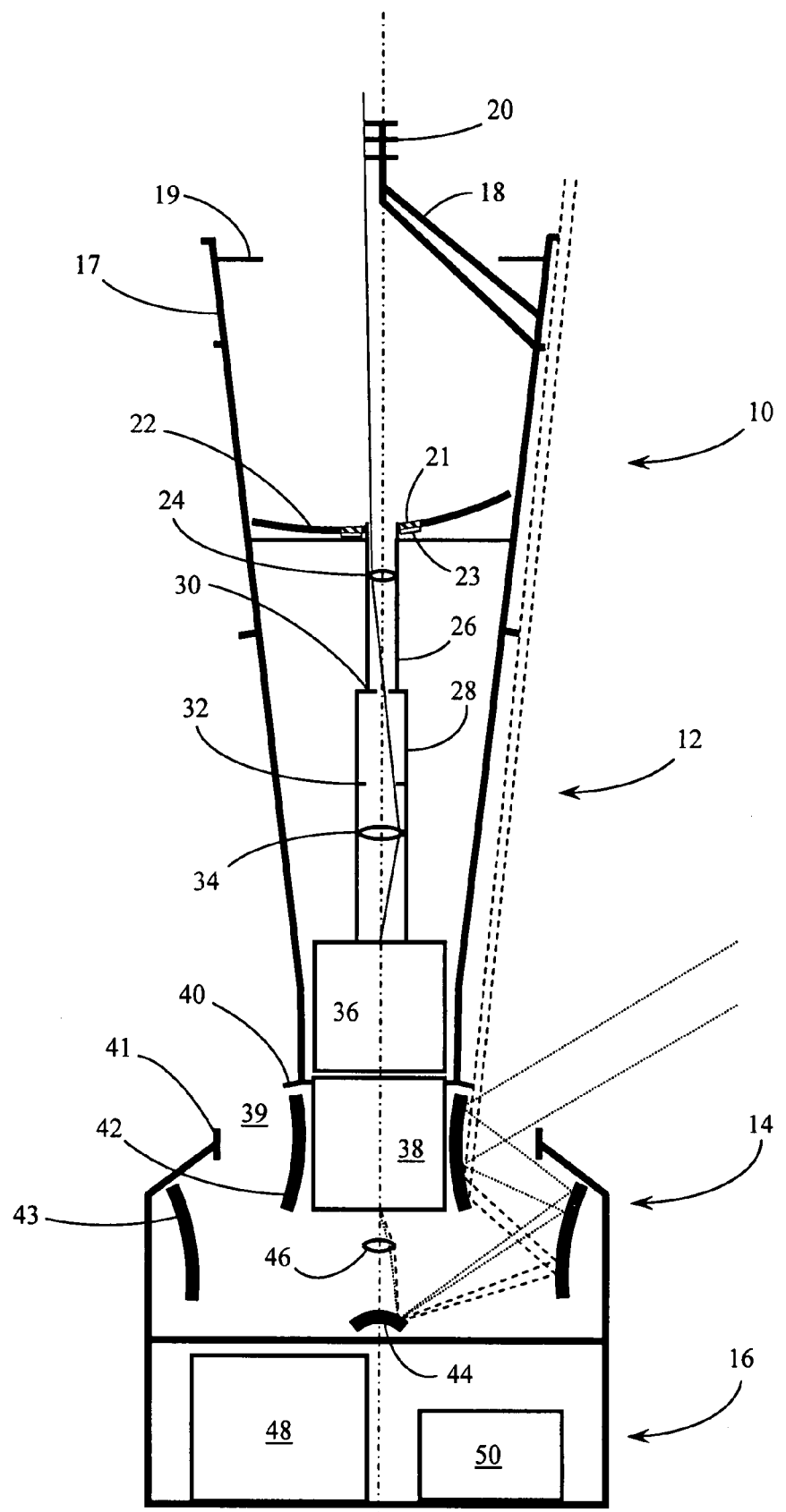

US 8,280,104 B2

DUAL ACQUISITION MINIATURE ALL-SKY CORONAGRAPH

CROSS REFERENCE TO RELATED APPLICATIONS

This Application claims the benefit under Title 35 United States Code §119(e) of U.S. Provisional Application No. 60/799,286 filed May 10, 2006, the full disclosure of which is incorporated herein by reference.

BACKGROUND OF THE INVENTION

1. Field of the Invention

The present invention relates generally to systems and methods for viewing and imaging the Sun. The present invention relates more specifically to an improved system for the simultaneous imaging of the solar corona and the inner heliosphere from a small, lightweight platform.

2. Description of the Related Art

It is known that activity within the surface layers of the Sun, and in the region of space surrounding the Sun (primarily the corona and near-Sun heliosphere) can have a dramatic affect on both natural and man-made objects on and near the Earth. The monitoring of conditions and activities in the corona and near-Sun heliosphere can provide valuable advance warning of events so as to permit beneficial responses in sensitive systems on Earth and in Earth orbit. One extremely important use of visible light coronal monitoring is for the purpose of space weather forecasting. The existence of around the clock near-real time coronal images has greatly improved an understanding of the physics of space weather and also the ability to predict the affects of features and events that are visible on the disc of the Sun.

Coronal mass ejections (CMES) and their interplanetary manifestations (ICMEs) affect Earth and nearby spacecraft in a number of important ways. These CMEs send accelerating particles into the solar system and affect the shape and topology of the magnetosphere about the Earth. Protons accelerated to high energies by ICMEs are known to be hazardous to spacecraft due to their direct interaction with micro-circuitry, their charging of the spacecraft to high potential, and the space charging of insulators as protons embed themselves in the material. There are actions that can be taken to mitigate the effects of ICMEs on such spacecraft if sufficient warning is provided. Particle acceleration associated with these events is a relatively prompt process with the onset of particle showers occurring minutes to hours after the onset of the CME at the surface the Sun. While some high energy particle events appear to originate in the large scale magnetic X-point associated with a large solar flare, the large majority of these events appear not to originate directly in the solar flares, but begin during the acceleration of the CME through the middle to outer corona of the Sun. This is probably due to the turbulence in the shock wave near the leading edge of the CME.

An operational patrol instrument could provide on the order of one hour's warning of the above described type of proton storm by monitoring the solar corona in real time and detecting the early stages of propagation for fast moving CMEs. The need for this type of measurement motivates both extreme ultraviolet disc imagers and visible coronagraphs which can detect the CME as it lifts off and accelerates through the medium of the solar corona. To be useful for predicting proton storms at the Earth from direct observation of the causing event, coronal measurements must be frequent and prompt. A delay of more than 15-30 minutes can be the deciding factor in determining whether a warning is generated before a storm arrives.

Direct interaction of ICMEs with the Earth's magnetosphere gives rise to geomagnetic storms and associated events. Because of the relatively long propagation time and rich phenomenology of the inner heliosphere, CME behavior at the Sun does not correlate particularly well with ICME behavior or arrival time at Earth. ICMEs can propagate faster or slower than expected by a factor of two, based on initial coronagraph data, and can even engulf one another during their propagation.

Upstream in situ measurements of the solar wind can provide 1-2 hours warning of geomagnetic events (for spacecraft situated near L-1 (Sun-Earth) or in front of it, respectively) by measuring changes in the solar wind pressure and ambient magnetic field before those changes propagate to the Earth itself. However, an understanding of the propagation and evolution of ICMEs in general and of specific events in particular requires monitoring them as they propagate through the inner solar system. Heliospheric monitoring could extend reliable forecasting of major geomagnetic storms from less than two hours (with in situ patrol data) to more than a day (by monitoring the ICME as it propagates through the inner solar system).

The state of the art in near-Sun white light imaging is exemplified by the Solar and Heliospheric Observatory (SOHO) Large Angle and Spectrometric Coronagraph (LASCO) instrument. The LASCO C-3 instrument is an externally occulted coronagraph that collects an image of the outer solar corona several times per hour. Scattered light performance in the LASCO instrument is very good with excellent stability. Instrument cadence, however, is severely limited by available telemetry. LASCO C-3 uses long exposures (19 sec) and as a result is quite susceptible to cosmic ray hits on the detector. These normally take the form of transient spikes but can overwhelm the image during proton storms. This is unfortunate as proton storms occur during the acceleration phase of large CMEs, precisely the time when one is most interested in having good coronal data.

Finally, analysis of LASCO data shows that instrument stability, rather than stray light level, is the most important consideration for operational measurements. CMEs are bright structures, and tracking them is considerably less difficult than, for example, identifying streamers or polar plumes. One benefit of LASCO data is the high stability of the instrument and the platform on which it rests, simplifying analysis and background subtraction.

Wide field heliospheric imaging is a less mature field. Existing and planned missions use two separate strategies, neither of which is wholly suited to low-cost patrol measurement from near Earth. One approach uses three linear detectors that are scanned azimuthally to build up a wide angle image, by the rotation of the host spacecraft. The NASA Solar Terrestrial Relations Observatory (STEREO) Mission Heliospheric Imager (HI) instrument uses a conventional camera lens buried in a baffled corral to achieve extremely low background levels at the expense of field of view. In general this is a good trade-off to make as the STEREO mission is traveling around the Sun and the portion of the corona that is of most interest is near the Earth-Sun line. A further approach involves a hemispherical imager that makes use of annular reflective optics and a shallow corral to image a complete hemisphere of the sky with extremely low scattered light. This latter design, like the corral instrument on STEREO, requires mounting on the side of the spacecraft, defining a particular look direction and requiring two instruments for a heliospheric patrol.

While some efforts in the past have included the use of annular aspheric reflecting optics to reduce stray light in a hemispheric imager, these systems reduce stray light by pointing the imager away from the sun such that the entrance aperture of the instrumentation is shaded by the support structure of the instrument itself. One disadvantage with such designs is that the entire inner heliosphere can not be imaged with a single instrument.

Optical measurements of the solar corona must consistently deal with noise reduction requirements. The dominant source of light in the solar system is the solar disc with a surface brightness eight orders of magnitude higher than the typical mid-coronal brightness, just two degrees from the Sun (as seen from the Earth). The corona itself glows primarily with reflected light from the Sun. There are two components to the visible corona. The Fraunhofer (F) corona (which consists of scattered light from small dust particles near the Sun) is not particularly important for space weather prediction. The continuum (K) corona, on the other hand, consists of Thomson scattered light from electrons near the Sun. The F-corona has between three and thirty times the brightness of the K-corona. Even with a perfect, stray light free instrument, measurements of the K-corona require separating the weak Thompson scattering signal from the much stronger F-corona. Provided that the stray light pattern is fixed, it may be removed by the same background subtraction techniques as the F-corona, so reducing instrumental stray light well below the level of the F-corona may not be a good use of resources for a cost constrained operational mission. Rather, instrument stability, pointing knowledge, and dynamic range become paramount considerations.

It is difficult to overstate the importance of visible-light coronal imaging to space weather forecasting. The benefits and difficulties of coronal imaging are well known in the solar and heliospheric communities and as such provide the motivation and design trade-offs for the development of an improved solar imaging system. The existence of around-the-clock, near-real-time coronal images (from SOHO/LASCO) has greatly improved our understanding of the physics of space weather and also our ability to predict the effects of features and events that are visible on the disk of the Sun. This understanding has highlighted the necessity of such observations on an ongoing basis.

SUMMARY OF THE INVENTION

The system of the present invention is a single cylindrical package combining both a coronal and heliospheric imager on a common axis of symmetry. The optics, baffles, and outer envelope of the instrument are described by a figure of revolution about the centerline. The wide field annular coronagraph of the present invention starts with conventional optical design concepts in annular geometry. The solar coronal imager component of the present invention nestles within the occulting cone of the wide field annular coronagraph, simplifying space frame requirements and reducing structural mass. The wide field annular coronagraph occulting cone doubles as a radiator or coolant system for the camera of each subsystem.

The characteristics of the two basic components of the system of the present invention may be described in general as follows:

The wide field annular coronagraph (WAC) incorporates an annular wide field optical train. The detector in the preferred embodiment is a 1280×1024 CMOS (6.7 μm pixels) device. The field of view (FOV) is annular and encompasses a range of 16-240 $R_0$ (4°-60°). Spatial resolution (determined by the 1024 pixel dimension) in the preferred embodiment is 14 arcmin (two pixels). The spectral range is white light, but the system can accommodate filters. The typical exposure time for the WAC is three seconds, with multiple exposures per down-linked image. The sensitivity on the inner boundary is approximately $10^{-14}$ $I/I_0$ and on the outer boundary approximately $10^{-16}$ $I/I_0$. The sample rate for the WAC is dependent on the rate of telemetry available to transfer image data from the instrument with a maximum of 0.5 to 1 per minute. Data latency is less than two minutes.

The solar coronal imager (SCI) of the system of the present invention is a conventional externally occulted coronagraph. The detector in the preferred embodiment of the SCI is a 1280×1040 CMOS (6.7 μm pixels) device. The FOV is annular and encompasses a range of 5-17 $R_0$ (1.25°-4.25°). Spatial resolution (determined by the 1024 pixel dimension) in the preferred embodiment is 60 arcsec (2 pixels). Again, the spectral range is white light, although the system can accommodate filters. The typical exposure time for the SCI is one second, with multiple exposures per down-linked image. The sensitivity on the inner boundary for the SCI is approximately $10^{-11}$ $I/I_0$ and on the outer boundary approximately $10^{-15}$ $I/I_0$. The maximum brightness for the SCI is $10^{-7}$ $I/I_0$ at a 30 ms exposure. The sample rate is also dependent on the rate of telemetry available to transfer image data from the instrument with a maximum of one per minute. Data latency is less than two minutes.

Spatial resolution in each case (WAC and SCI) is determined by the 1024 pixel dimension of the detector for both channels, and the annular field of view. Expanding the focal length of each channel by a factor of 25% yields a similar field of view in the plane of the ecliptic and a 25% better resolution at the expense of polar views.

Additional design features of the overall system include its small light form which permits the WAC cone to serve as a structure for the SCI and as a radiator. The mechanical interface for the system involves a simple three point mount to spacecraft front face. The electrical interface includes a single cable with CCSDS (Consultative Committee for Space Data Systems) data standards and a 28 volt power supply feed. Thermal control within the system is passive via radiation. The system enjoys a full annular view with a single image capturing the entire inner heliosphere. Image cleanliness is established with onboard multi-exposure despiking, which reduces or eliminates the effects of cosmic ray hits. The reliability of the system comes in part from its support for dual-string Command and Data Handling (C&DH) electronics. A built in sensor with a sensitivity of approximately 1 arcsec provides the pointing knowledge for the system. Self-safing features close the shutters on spacecraft off-point.

In summary, the present invention is intended to serve as a new form of lightweight instrumentation to photograph the solar corona and the entire inner heliosphere simultaneously in a small package intended for deployment in space. There are several aspects of the present invention that address problems encountered in the prior art. One such aspect is the use of annular aspheric reflecting optics in an azimuthal configuration (with the Sun along the instrument's axis of symmetry) together with a baffle design that preferentially reduces stray light at angles far from the Sun so as to produce a wide-angle image with very low stray light characteristics. A further aspect is the manner in which the imaging system provides simultaneous utilization of the occulting cone of the WAC as a radiative cooler. A further aspect is the manner in which the system uses the volume inside the occulting cone of the WAC to house a second instrument, the SCI.

The first advantage mentioned above reduces the number of instruments required to image the inner heliosphere compared to the prior art. The additional advantages mentioned above serve to reduce the mass and volume of the overall system required to accommodate the respective instrumentation. These advantages make the imaging system of the present invention amenable to use in small lightweight packages for deployment as Earth orbiting satellites or near-Earth solar orbiting satellites.

BRIEF DESCRIPTION OF THE DRAWINGS

FIG. 1 is a schematic cross-sectional view of the multi-component cylindrical structure of the system of the present invention.

DETAILED DESCRIPTION OF THE PREFERRED EMBODIMENTS

To address the goals and objectives described above for CME imagery the present invention provides a Dual Acquisition Miniature All-Sky Coronagraph (DAMASC), that can accomplish both operational and scientific observation of CMEs in a single, compact package suitable for deployment on many types of spacecraft. The imaging system operating characteristics balance several design considerations such as spacecraft accommodation, overall cost considerations, stray light level, and data quality.

The imaging system instrument incorporates both a conventional disk-occulted coronagraph and an advanced annular wide-field camera in a single package (see FIG. 1). The combined instrument is small (approximately 17 cm diameter×50 cm long), lightweight (~4 kg), and self-contained, with a single three-point kinematic mount to the host platform and a single cable connection for power and C&DH. The minimum total power requirement is ~5 watts. Thermal control is accomplished by way of passive radiation out the sides of the instrument, further simplifying accommodation. The imaging system has self-safing capability in case of spacecraft off-point. Furthermore, the instrument package can provide its host spacecraft with pointing feedback data that can be used as input to the pitch/yaw portion of a closed-loop three-axis pointing system.

The imaging system of the present invention performs a large amount of data processing on board, collecting as many as 10 exposures for each down linked image. The multiple exposures allow despiking of the data as it is collected, making the system collected data essentially immune to the proton storms that accompany strong CMEs. The system performs simple CME detection and tracking on-board, allowing downlink of summary parameters such as a detection flag in the spacecraft housekeeping stream. As a result, the imaging system is extremely flexible in its use of telemetry. Image data may be compressed for downlink using advanced wavelet compression algorithms, allowing identification of CMEs in images compressed to less than 0.5 bits per pixel meaning that the system can carry out its minimum mission of 15 minute cadence imaging with as little as 250 bps of telemetry. Returned operational and science value improves steadily with telemetry bandwidth to a useful maximum of about 90 kbps.

Reference is now made to FIG. 1 for a detailed description of the structures and functions of the system of the present invention. The solar imaging system is designed to satisfy the need for operational CME imaging with the smallest, most easily accommodated instrument package possible. It takes the place of two or more coronagraph-type instruments, imaging the mid-to-outer corona and the entire inner solar system at two focal planes in a single tightly packaged instrument 10 as shown in FIG. 1. As indicated above, the basic design is accommodated with a 1 cm margin in a 17 cm diameter×50 cm long cylinder, with an estimated mass of ~4 kg. The cylinder contains two separate externally occulted coronagraphs: a wide-field annular coronagraph (WAC) 14 that images elongation angles from 4° to 60° (16 to 240 apparent solar radii), and an externally occulted solar coronal imager (SCI) 12 that photographs the solar corona at solar elongation angles from 1.25° to 4.25° (5 to 17 apparent solar radii). The WAC 14 uses conventional optical design in a novel geometry to image the entire inner solar system with each exposure. The sunward baffle for the WAC 14 forms a cone 17 that also serves as surrounding structure for SCI 12 and cooling radiator for both cameras 36 and 38, simplifying spacecraft accommodation for the overall instrument 10.

Also as indicated above, the system occulters and baffles are sized for the Sun as seen from 0.97 AU, so that the instrument may be used essentially unchanged in any of a number of potential orbits. Both cameras 36 and 38 make use of CMOS detection, reduce the radial gradient in image brightness through appropriate use of vignetting, operate in visible light, and can accept colored or polarizing filters to optimize operational and scientific data return.

Neither camera 36 or 38 uses a shutter in normal operation, though a safety shutter is provided to prevent direct exposure to the Sun's rays. The shutters (not shown) can be fabricated from neutral-density filter material to allow the instrument to serve as a coarse pointing system by imaging the disk of the Sun during spacecraft off-points. Self-safing of the instrument is driven by signals from several photocells (not shown) that are mounted around the penumbra of the SCI occulter 20 and in the umbra of the WAC occulter 17. A side benefit of including these photocells is that the imaging system 10 can serve as a fine pointing sensor with estimated sensitivity of less than 1 arcsec, replacing or serving as a backup to a separate spacecraft-mounted sensor.

The Wide-Field Annular Coronagraph (WAC) Component

The WAC 14 utilizes conventional optical design principles in a novel annular geometry. The camera 38 aperture is at the rear of a shallow corral 39 baffled to admit rays from only the desired directions into a wide-field imaging system. The WAC 14 differs from wide-field imagers such as the HI onboard NASA's STEREO mission, in that the corral 39 is a figure of revolution about the Sun-instrument line (dash-dot axis line in the figure), rather than an isolated depression in the side of the spacecraft. It differs from previous designs in that the instrument's symmetry axis is oriented to point through the Sun rather than off to one side, allowing capture of the entire Sunward portion of the sky with only a single focal plane.

In three dimensions (rotated about the axis line), the leading side 40 of the corral 39 forms a conical occulter 17 in front of an annular aperture. The occulter 19 is supported by three legs (not shown) that pass below the baffles 40 and 41, minimizing stray light from the leg edges. The occulter 17 itself forms the support structure for the second solar (corona) imaging system (associated with the SCI 12) that images the narrow field near the bore sight of the instrument 10.

The first optical surface 42 in the WAC 14 is an annular, shallow-incidence primary mirror that directs rays outward. Rays are reflected from a secondary mirror 43 inward to form a real image near a domed convex tertiary mirror 44 at the optic axis of the instrument 10. These first three optics (42, 43

& 44) form an anamorphic focusing system, with the tertiary mirror 44 flattening the field to yield a focused virtual image that is re-imaged onto the camera 38 focal plane by a conventional lens 46. The principal design difference between the WAC 14 optical train and a conventional anamorphic imaging system (such as is used by movie studios to decouple the aspect ratios of film and screen) is that the WAC 14 has rotational symmetry about the center of the focal plane. This sets the azimuthal radius of curvature of each optical element to be exactly equal to the distance from the centerline. The position and longitudinal curvature profiles of each optic remain, however, as adjustable design parameters for the present invention.

The baseline camera 38 is configured at 1280×1024 with 6.7 μm pixels; together with the overall focal length of 4.2 mm. This yields 5.6 arcmin per pixel and a rectangular field of view that is 120° in the E/W direction and 96° the N/S direction, for an instrument resolution close to 11 arcmin in the radial direction with the baseline detector. The tripod legs will interrupt a total annular angle of 6°-9° or 1.6%-2.5% of the total circumference of the image.

The entrance mirror 42 is partially vignetted by the sunward edge 40 of the occulter/corral 39 which reduces the effective f-ratio from near f/2 (for elongation angles wider than 10°) to about f/8 near the central obscuration. The vignetting reduces variations in dynamic range across the image. The design also takes advantage of variation in input angle to reduce scattered light more effectively in the parts of the image that are faint. This results because the portion of the primary mirror 42 that handles high elongation angles is recessed farther behind the leading baffles 40, further reducing stray light input.

The principal source of scattered light for the WAC 14 is diffraction around the leading edge of the front baffle 40. The primary annular mirror 42 is positioned so that the parts of the mirror that reflect "dark sky" (incident light lines shown as dotted lines in FIG. 1) far from the Sun are recessed and shaded more darkly than the parts which reflect "light sky" (incident light lines shown as dashed lines in FIG. 1) close to the Sun, greatly improving the stray light characteristics far from the Sun.

The WAC camera 38 is located at the base of the occulting cone 17, and is cooled by conduction into the cone itself, which also serves as a radiator. Placement of four photocells (not shown) at 90° intervals about the perimeter of the instrument 10, just inside the umbra of the occulting cone 17 and below the outer baffle 41 of the annular WAC aperture 39, allows automatic safing of the instrument in case of wide pointing excursions, while not significantly affecting the stray light performance. The photocell signals are amplified on the power relay card 50 and used to generate a bi-level input to the Command & Data Handling (C&DH) computer 48, both of which are positioned within the electronics compartment 16 of the instrument package 10.

The Solar Coronal Imager Component

The SCI 12 is a conventional externally-occulted coronagraph, with design elements that are similar in some respects to the LASCO C-3 camera aboard SOHO. It has an effective focal length of 44 mm, yielding a pixel size of 30 arcsec. The resolution is pixel limited, yielding 60 arcsec spatial resolutions. The baseline field of view is annular, with elongation angles of 1.25°-4.25° (5 $R_S$-17 $R_S$) and an image diameter of 1000 camera pixels. A significant design trade-off exists between distance to the occulting disk 20 and the innermost boundary of the field of view. It may be possible to extend the occulting disk 20 farther from the focal plane, potentially allowing an inner boundary just 0.75° (3 $R_S$) from disk center.

The occulting disk 20 is located at the front of the instrument 10 and consists of multiple disks, each of which occults the diffraction pattern from the last. The occulting disk 20 is supported by a single pylon 18. The pylon 18 has multiple ridges (not shown) that serve the same function as the multiple disks in the occulter 20. The inside wall of the cone is shaded by an annular baffle 19 that forms the entrance aperture of the SCI 12 and partially surrounds a 'vestibule' volume. The inner edge of the front baffle 19 is illuminated but is hidden from the objective lens 24 by the edge of a baffle tube 26 that protects the objective 24. Sunlight that does not impact the occulting disk 20 or front baffle 19 is reflected by a curved heat-rejection mirror 22. The mirror 22 is curved to partially focus the exiting beam and prevent it from directly illuminating the pylon 18 or inner edge of the leading baffle 19.

The SCI objective optic 24 is an antireflection-coated singlet lens operated at f/8. The beam passes through a field stop 30 at the image plane and a Lyot stop 32 at the plane conjugate to the front baffle 19 to eliminate diffracted light from the baffle's edge. The beam is re-imaged onto the camera 36 by a compound lens 34 operated at f/4.

Like LASCO C-3, the SCI 12 of the present invention makes use of vignetting to reduce the dynamic range of the field of view. The camera 36 has fully controllable exposure time, permitting additional broadening of the dynamic by compositing multiple exposures with different exposure times. To additionally address stray light concerns it may be necessary to incorporate a small additional internal occulter at the Lyot stop 32, to obscure diffracted light from the external occulter 20 and/or pylon 18.

Safing of the SCI 12 is handled by four photocells 23 mounted under the heat-rejection mirror 22, in the penumbra of the external occulter 20. To avoid additional scattered light, the silvering of the heat-rejection mirror 22 is smoothly reduced ~1% transmittance at four 1.5 mm diameter spots 21, permitting four attenuated beams to penetrate into the volume outside the baffle tube 26. The beams are then intercepted by the four photocells 23 mounted directly to the underside of the mirror 22. Excessive flux in any one photocell 23, or a strong enough difference in flux between any two opposite photocells 23, causes the shutters (not shown) to close. This solution works because the thinned silver layer does not increase stray light as would a drilled hole. The four photocell signals are amplified and processed on the power relay card 50 to provide a bi-level input to the C&DH computer 48. The amplified analog signal can also be digitized by the system C&DH electronics 16 or fed directly to the host spacecraft if desired as part of a closed-loop pointing system.

The System Electronics

The imaging system of the present invention is intended as a single self-contained module 10 that can be integrated easily into available spacecraft with minimal risk and accommodation cost. The instrument avionics 16 in the preferred embodiment are therefore contained in the main instrument body 10. The system's power requirements in the preferred configuration described herein are moderate (10 watts nominal at 28 V unregulated, minimum ~5 watts) and when solar pointed the imaging system may be thermally isolated from its support spacecraft The electrical interface consists of a standard CCSDS connection, 28 V power, and several bi-level command lines. At 7-10 watts, the system instrumentation powers the avionics and both cameras continuously, ensuring a uniform thermal environment within the instrument. In the preferred embodiment, the system can be setup to stagger the camera power, reducing the required power to under 5 watts, allowing operation even on severely power-constrained deep space missions.

To accomplish the desired preprocessing and control onboard, the system of the present invention preferably operates in conjunction with existing flight computers that utilize readily available high performance industrial components such as Blackfin® signal processors. These systems are capable of yielding a MIPS/watt level an order of magnitude higher than a RAD750 computer, at considerable mass and volume savings. A small power relay board 50 includes switching and isolation relays and a watchdog timer to reboot the onboard computer 48 in case of single event upset. The system enclosure 16 structure and geometry can accommodate dual-string C&DH electronics if required for the mission. Camera power and data cables are positioned and hidden on the underside of the three-legged frame (not shown) that supports the central cone 17.

The System Cameras

Digital imaging devices 36 and 38 appropriate for use in conjunction with the system of the present invention include the Silicon Imaging SI-1280F-CL device, a 1.3 megapixel CMOS digital camera. This is a commercially available camera that may be ruggedized for use in the present application. The SI-1280F-CL (or its equivalent) is appropriate in this application because of its functional performance, low power, and small size. The imaging arrays are 1280×1024, with 6.7 μm square pixels. Light levels are sampled with 12-bit resolution and a nominal signal to noise ratio of 67.5 dB. The pixel clock allows frame speeds of up to 41 fps full frame, with exposure time selectable between 1 μs and 4 s. Each camera draws 2.5 watts of power at 5 volts. An advantage of the variability in exposure time is that a complete exposure sequence can be collected quite rapidly, greatly expanding the dynamic range of the system.

CME Tracking and Computer Pattern Recognition Methods

The instrument package of the present invention is intended to detect and track CMEs and ICMEs. In addition to providing an image stream to forecasters on the ground, the instrument package and ground system include computer pattern recognition components to identify CMEs without human intervention. CME detection on-board is important because it significantly reduces telemetry latency by abstracting one-bit quantities, such as whether a CME is present, from the data stream. This allows transmission of operationally important parameters even when a high-speed telemetry link contact is not available, using broadcast low-volume housekeeping data in a spacecraft "beacon" mode. The on-board detection information can be used to trigger activity on the ground even before the relevant images can be down linked in full.

Identifying that a CME is occurring requires identifying the CME signal against the background of the F-corona and instrumental stray light in recently acquired SCI data; eliminating variations in the visual field due to possible spacecraft pointing jitter, stray light variations from pointing jitter, motion of the solar sail (if applicable) or from the nearby Earth. Additionally the process requires identifying and ignoring 'snow' caused by energetic particle hits on the detector.

The system of the present invention may use running difference images to remove the effects of the background F-corona and stray light for on-board CME tracking. Using on-board running-difference images overcomes complications due to small spacecraft offsets. The brightness signal of an outbound CME is quite different from the brightness signal of a spacecraft offset. Algorithms that search for outbound features by checking for large, sudden brightenings and radially oriented dipoles may be used for CME identification. In addition, the system may sub-sample the image for speed, yielding positive detection of even faint CMEs with computing resources comparable to those required for image compression. The measured spacing of radial dipoles is used to estimate instantaneous speed; peak brightness is used to find location.

System Deployment Scenarios

The instrument package of the present invention is designed to be accommodated easily on available spacecraft missions. The instrument package is designed to have clean interfaces and modest mass, power, and pointing requirements. The instrument package includes its own power relay/analog card to switch and condition power from the spacecraft, serve as a watchdog for the flight computer, and condition analog data from the safing photocells. The amount of telemetry required to return useful information is very small (250 bps) but the quality of returned operational data increases smoothly up to a maximum useful telemetry level of 90 kbps. While the WAC is intended to be deployed with a hemispherical clear view, small obstructions can be accommodated with internal occulting baffles placed near the annular prime focus inside the WAC.

Some operational parameters of the preferred system may change based on the mission profile of the spacecraft on which the instrument package is mounted. The differences relate to three main orbital scenarios: near-L1 station-keeping, over-pole station-keeping with a solar sail, and Earth orbit. Near-L1 ballistic orbit or supra-L1 deployment with a solar sail for station-keeping each afford a clear forward view from the spacecraft, but constrain telemetry back to Earth. Available telemetry for such deployments is estimated to be 1-5 kbps, and imaging cadence is limited by the amount of available telemetry. Use of a sail to keep station to the north or south of the ecliptic plane offers similar telemetry challenges to an L-1 mission, but with the added challenge of eliminating possible stray light from the sail, which is to one side of the spacecraft and may be placed far enough forward to scatter light into the WAC aperture. If sail glint is an issue, then additional baffling may required for the WAC as discussed above.

In geosynchronous or other near-Earth orbit, telemetry constraints are relaxed considerably but at a cost. The Earth itself is a major source of stray light and as such, in these orbits, the WAC may also require additional external baffling. Operational modifications to the basic structure can make the WAC suitable for use in Earth orbit even without additional baffling. It may be possible, for example, to fly multiple WACs on different spacecraft to allow continuous coverage of the Sun from whichever spacecraft is Sunward of Earth. The objective of 60 minute cadence images from the WAC can be nearly met simply by running the WAC when the spacecraft is at its closest approach to the sub-solar point on Earth, about once every 90 minutes; but additional mitigation of geocoronal and auroral effects becomes necessary.

In the manner described, the present invention therefore provides systems for the simultaneous imaging of the solar corona and the inner heliosphere from a small, lightweight platform positioned in space.

Although the present invention has been described in terms of the foregoing preferred embodiments, this description has been provided by way of explanation only, and is not intended to be construed as a limitation of the invention. Those skilled in the art will recognize modifications of the present invention that might accommodate specific spacecraft environments and structures. Such modifications, as to structure, orientation, geometry, and even optical train configuration, where such modifications are coincidental to the type of spacecraft being utilized, do not necessarily depart from the spirit and scope of the invention.

I claim:

1. A solar imaging system for simultaneously imaging the solar corona and inner heliosphere of the Sun, the imaging system comprising:
    a wide-field annular coronagraph (WAC) comprising:
        an optic system of annular, aspheric reflecting optics centered around a cylindrical axis of symmetry wherein the axis coincides with the azimuthal orientation of the imaging system towards the Sun;
        an occulting cone having an axis of symmetry coinciding with the axis of symmetry of the optic system;
        a baffle system for reducing stray light at angles far from the Sun, the baffle system positioned in association with the reflecting optic system; and
        at least one digital electronic imaging device;
    a solar coronal imager (SCI) positioned within the occulting cone of the WAC, the SCI comprising:
        an optic system of axially aligned refracting optics centered on an axis of symmetry wherein the axis coincides with the azimuthal orientation of the imaging system towards the Sun;
        at least one occulting disk having an axis of symmetry coinciding with the axis of symmetry of the optic system; and
        at least one digital electronic imaging device; and
    image processing instrumentation connected to the at least one digital electronic imaging device of the WAC and the at least one digital electronic imaging device of the SCI.

2. The solar imaging system of claim 1 wherein the occulting cone of the WAC within which the SCI is positioned comprises a radiative cooler for conducting thermal energy away from the imaging devices.

3. The solar imaging system of claim 1 wherein the SCI further comprises a rejection mirror for reflecting a majority of light received by the SCI outside the umbra of the occulting disk thereof.

4. The solar imaging system of claim 3 further comprising a pointing and safety system for shuttering the solar imaging system on an off-point event, the pointing and safety system comprising a plurality of photocells positioned on a backside of the rejection mirror outside the umbra of the occulting disk and wherein the rejection mirror comprises a plurality of partially silvered areas on the mirror adjacent the photocells.

5. A method for automatically detecting and tracking coronal mass ejections (CMES) and interplanetary manifestations (ICMEs) thereof, the method comprising the steps of:
    providing a wide-field annular coronagraph (WAC) comprising an optic system, an occulting cone, a baffle system, and at least one imaging device;
    providing a solar coronal imager (SCI) positioned within the occulting cone of the WAC, the SCI comprising an optic system, at least one occulting disc, and at least one imaging device;
    imaging the solar corona with the SCI;
    discriminating F-corona background and instrument stray light;
    discriminating variations in visual fuel data due to spacecraft characteristics; and
    discriminating noise deriving from energetic particle hits on the SCI.

6. The method of claim 5 wherein the step of discriminating F-corona background and stray light comprises comparing difference images in onboard image analysis and pattern recognition software.

* * * * *